(12) United States Patent
Shimizu (10) Patent No.: US 10,018,705 B2
(45) Date of Patent: Jul. 10, 2018

(54) RADIO COMMUNICATION APPARATUS AND BEAM CONTROLLING METHOD

(71) Applicant: FUJITSU LIMITED, Kawasaki-shi, Kanagawa (JP)

(72) Inventor: Masahiko Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 276 days.

(21) Appl. No.: 15/050,721

(22) Filed: Feb. 23, 2016

(65) Prior Publication Data

US 2016/0308280 A1    Oct. 20, 2016

(30) Foreign Application Priority Data

Apr. 14, 2015   (JP) .................. 2015-082586

(51) Int. Cl.
*G01S 5/06* (2006.01)
*H04B 7/06* (2006.01)
*G01S 3/74* (2006.01)

(52) U.S. Cl.
CPC .............. *G01S 5/06* (2013.01); *H04B 7/0617* (2013.01); *G01S 3/74* (2013.01)

(58) Field of Classification Search
CPC  H01Q 3/00; H01Q 3/26; H01Q 3/267; H01Q 3/2676; H04B 7/0617; G01S 5/06
USPC ........................................................ 342/368
See application file for complete search history.

(56) References Cited

U.S. PATENT DOCUMENTS

2013/0040682 A1   2/2013  Chang et al.

FOREIGN PATENT DOCUMENTS

JP   2014-527749   10/2014
WO   2013022161    2/2013

OTHER PUBLICATIONS

Xiaojing Huang, et al., "A Hybrid Adaptive Antenna Array", IEEE Transactions on Wireless Communications, vol. 9, No. 5, pp. 1770-1779, May 2010 (10 pages).

*Primary Examiner* — Harry K Liu
(74) *Attorney, Agent, or Firm* — Fujitsu Patent Center (57) ABSTRACT

A radio communication apparatus includes an estimating unit that estimates directions of arrival of signals transmitted by a plurality of respective users, a calculating unit that calculates a map as a trigonometric function of an angle representing each of the directions of arrival estimated by the estimating unit, a grouping unit that groups the users based on the maps calculated by the calculating unit, and a determining unit that determines a weight coefficient for forming a directional beam steered to a user belonging to a group, for each group resultant of grouping performed by the grouping unit.

8 Claims, 9 Drawing Sheets

RADIO COMMUNICATION APPARATUS AND BEAM CONTROLLING METHOD

CROSS-REFERENCE TO RELATED APPLICATION

This application is based upon and claims the benefit of priority of the prior Japanese Patent Application No. 2015-082586, filed on Apr. 14, 2015, the entire contents of which are incorporated herein by reference.

FIELD

The embodiments discussed herein are related to a radio communication apparatus and a beam controlling method.

BACKGROUND

As technologies for controlling a directional beam using an array antenna, which is an arrangement of a plurality of antenna elements, analog control which uses a phased array, and digital control in which each antenna element is weighted through digital signal processing are generally known. Because the analog control uses one chain of a radio circuit and a digital-to-analogue (DA)/analogue-to-digital (AD) converter for a plurality of antenna elements, power consumption by the analog control is relatively low. With the analog control, however, because a directional beam (hereinafter, simply referred to as a "beam") is formed in one direction, it is difficult to steer beams to a plurality of users simultaneously. By contrast, beams can be easily steered to a plurality of users simultaneously with the digital control, while the digital control uses a plurality of chains of a radio circuit and a DA/AD converter, in the number equal to the number of antenna elements, which results in increasing of the power consumption by the digital control.

To address this issue, hybrid control, which uses a combination of the analog and the digital beam control, has been recently developed. With the hybrid control, beams can be steered to a plurality of users simultaneously while consuming less power than that in the digital control. In other words, although the hybrid control uses a plurality of chains of a radio circuit and a DA/AD converter, each of the chains including the radio circuit and the DA/AD converter is connected to a plurality of antenna elements. Therefore, a smaller number of chains of the radio circuit and the DA/AD converter, being smaller than the number of antenna elements, is used, and less power is consumed compared with the digital control. Furthermore, because a plurality of data streams in the number equal to the number of chains of the radio circuit and the DA/AD converters can be processed simultaneously, beams can be steered to a plurality of users in the number equal to the number of chains of the radio circuit and the DA/AD converters simultaneously.

[Patent Document 1] Japanese National Publication of International Patent Application No. 2014-527749.

[Non-Patent Document 1] Xiaojing Huang et al., "A Hybrid Adaptive Antenna Array", IEEE TRANSACTIONS ON COMMUNICATIONS, Vol. 9, No. 5, pp. 1770-1779, May 2010.

However, the hybrid beam control is, disadvantageously, not quite capable of steering beams to a plurality of users at the same power strength. In other words, because the hybrid control uses the combination of the analog control and the digital control, each of the antenna elements is weighted based on the phase difference between the antenna elements, based on the same scheme as that used in the analog control. The digital signal processing then adjusts the beams having been formed by weighting so that the beams can be steered to a plurality of users simultaneously. At this time, because the beam adjustment through the digital signal processing has a certain limitation, the beams resultant of the digital signal processing deteriorate, compared with the beams formed by weighting the antenna elements.

In this manner, in the hybrid beam control, because a beam corresponding to the analog control is more dominant, the power of a beam corresponding to the digital control may be weaker than that of the beam corresponding to the analog control. The hybrid beam control, therefore, is sometimes incapable of steering a beam to a user at sufficient power strength, depending on where the user is located, and the communication quality for the user may deteriorate.

SUMMARY

According to an aspect of an embodiment, a radio communication apparatus includes: an estimating unit that estimates directions of arrival of signals transmitted by a plurality of respective users; a calculating unit that calculates a map as a trigonometric function of an angle representing each of the directions of arrival estimated by the estimating unit; a grouping unit that groups the users based on the maps calculated by the calculating unit; and a determining unit that determines a weight coefficient for forming a directional beam steered to a user belonging to a group, for each group resultant of grouping performed by the grouping unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments are, however, not intended to limit the scope of the present invention in any way.

[a] First Embodiment

Figure 1:
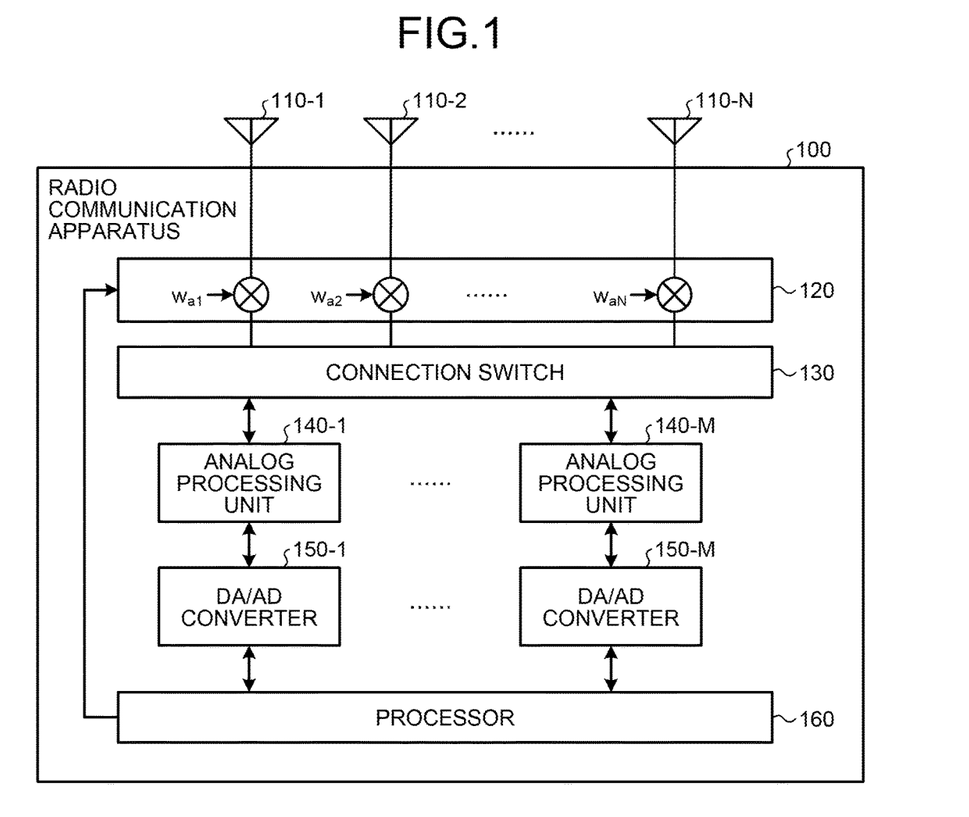
FIG. 1 is a block diagram illustrating a configuration of a radio communication apparatus according to a first embodiment.

FIG. 1 is a block diagram illustrating a configuration of a radio communication apparatus 100 according to a first embodiment. The radio communication apparatus 100 illustrated in FIG. 1 includes antenna elements 110-1 to 110-N (where "N" is an integer equal to or greater than two), a phase shifter 120, a connection switch 130, analog processing units 140-1 to 140-M (where "M" is an integer equal to or greater than two and less than "N"), DA/AD converters 150-1 to 150-M, and a processor 160.

The antenna elements 110-1 to 110-N are arranged one dimensionally in a line, and make up an antenna array. The pitch "d" between the antenna elements is set to a half of the wavelength λ of the radio waves transmitted or received by the antenna elements, for example.

The phase shifter 120 forms a beam by weighting the antenna elements 110-1 to 110-N with weight coefficients $w_{a1}$ to $w_{aN}$, respectively. The phase shifter 120 forms a beam using the weight coefficients $w_{a1}$ to $w_{aN}$ notified by the processor 160. Denoting the angle formed between the beam to be formed and the direction perpendicular to the arrangement direction of the antenna elements 110-1 to 110N as θ, a weight coefficient $w_{an}$ can be expressed by following Equation (1), for example (where "n" is an integer between one and "N").

$$W_{an} = e^{j2\pi(n-1)\frac{d}{\lambda}\sin\theta} \quad (1)$$

In Equation (1), "e" denotes the base of natural logarithm, "j" denotes the imaginary unit, "d" denotes the pitch between the antenna elements, and "λ" denotes the wavelength of the radio waves. By weighting the antenna elements 110-1 to 110-N with the weight coefficients $w_{a1}$ to $w_{aN}$, respectively, the phases of the radio waves emitted to the direction of the angle θ or the radio waves incident at the direction of the angle θ are synchronized among all of the antenna elements. A beam is therefore formed in the direction at the angle θ.

Figure 2:
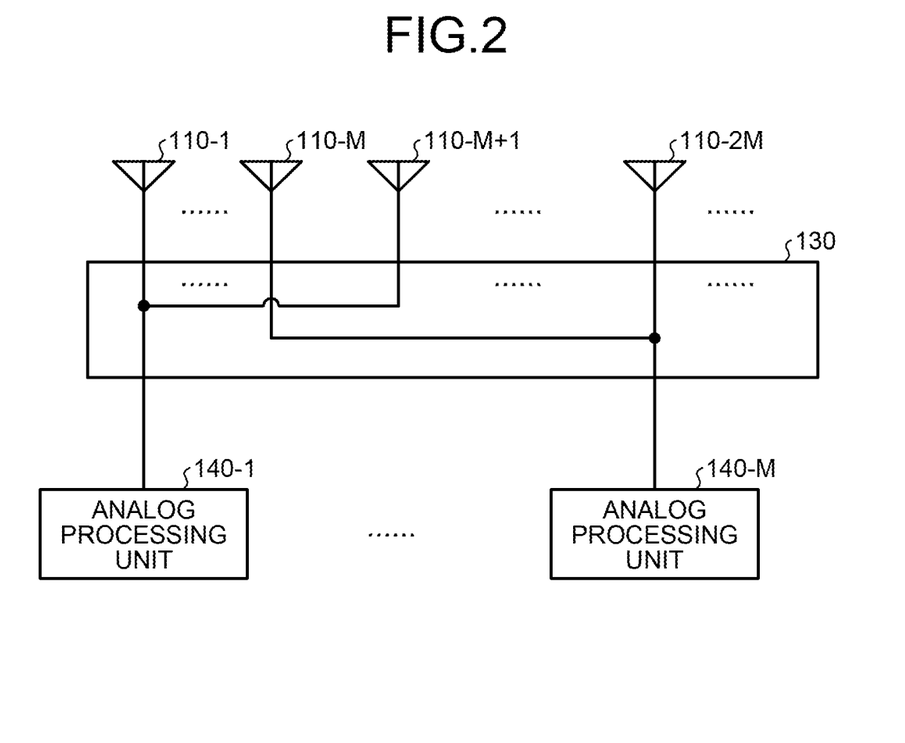
FIG. 2 is a schematic illustrating the connections established by a connection switch according to the first embodiment.

The connection switch 130 connects the antenna elements 110-1 to 110-N to the analog processing units 140-1 to 140-M. Specifically, the connection switch 130 connects the analog processing unit 140-1 and a set of antenna elements arranged at intervals of M antenna elements from the antenna element 110-1, and connects the analog processing unit 140-M and another set of antenna elements arranged at intervals of M antenna elements from the antenna element 110-M, for example, as illustrated in FIG. 2. In other words, to generalize the explanation, the connection switch 130 connects antenna elements 110-(i+aM) (where "a" is an integer equal to or greater than 0) to an analog processing unit 140-i (where "i" is an integer between one to M).

Referring back to FIG. 1, the analog processing units 140-1 to 140-M perform predetermined analog processing on transmission signals and reception signals. Specifically, the analog processing units 140-1 to 140-M up-convert and amplify transmission signals, and down-convert reception signals, for example.

The DA/AD converters 150-1 to 150-M DA-convert and AD-convert the transmission signals and the reception signals. In other words, the DA/AD converters 150-1 to 150-M DA-convert transmission signals output from the processor 160, and output the resultant analog signals to the respective analog processing units 140-1 to 140-M. The DA/AD converters 150-1 to 150-M also AD-converts reception signals output from the respective analog processing units 140-1 to 140-M, and output the resultant digital signals to the processor 160.

The processor 160 estimates the position of each user by estimating the direction of arrival of a reception signal received from the user, and calculates the weight coefficients for steering a beam to the user. At this time, the processor 160 calculates a map as a trigonometric function of an angle representing the position of the user, and puts the user into a corresponding group based on the calculated map. The processor 160 then determines, for each group, the weight coefficients for forming the beam.

Figure 3:
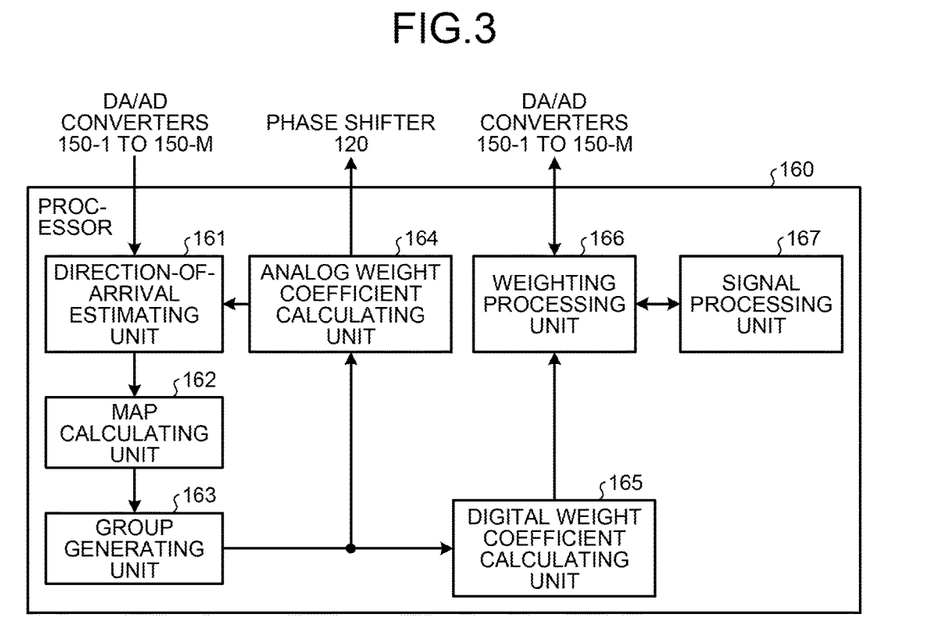
FIG. 3 is a block diagram illustrating functions of a processor according to the first embodiment.

Specifically, the processor 160 includes a direction-of-arrival estimating unit 161, a map calculating unit 162, a group generating unit 163, an analog weight coefficient calculating unit 164, a digital weight coefficient calculating unit 165, a weighting processing unit 166, and a signal processing unit 167, as illustrated in FIG. 3.

The direction-of-arrival estimating unit 161 acquires reception signals received from a plurality of respective users from the DA/AD converters 150-1 to 150-M, and estimates the directions of arrival of the respective reception signals. At this time, the direction-of-arrival estimating unit 161 estimates the direction of arrival of a reception signal by considering the weight coefficients $w_{a1}$ to $w_{aN}$ calculated by the analog weight coefficient calculating unit 164. In other words, the direction-of-arrival estimating unit 161 acquires the weight coefficients $w_{a1}$ to $w_{aN}$ set to the respective antenna elements 110-1 to 110-N from the analog weight coefficient calculating unit 164, and estimates the direction of arrival of the reception signal using the weight coefficients $w_{a1}$ to $w_{aN}$.

The direction-of-arrival estimating unit 161 calculates an angle formed by the direction perpendicular to the arrangement direction of the antenna elements 110-1 to 110-N and the direction of arrival of the reception signal, as an angle representing the direction of arrival of the reception signal. In other words, the direction-of-arrival estimating unit 161 calculates an angle using the direction perpendicular to the arrangement direction of the antenna elements 110-1 to 110-N as 0 degrees, as the direction of arrival of the reception signal.

The map calculating unit 162 calculates a map represented as a trigonometric function of the direction of arrival of each of the reception signals, the direction of arrival having been estimated by the direction-of-arrival estimating unit 161. Specifically, the map calculating unit 162 calculates the sine (sin) of an angle representing the direction of arrival of each of the reception signals. In other words, the map calculating unit 162 calculates the sine of an angle representing the position of a user as a map of the user. The direction-of-arrival estimating unit 161 may also calculate the direction of arrival of a reception signal as an angle with respect to 0 degrees extending along the arrangement direction of the antenna elements 110-1 to 110-N. In such a case, the map calculating unit 162 may calculate the cosine (cos) of an angle representing the position of a user.

The group generating unit 163 groups a plurality of users based on the map calculated by the map calculating unit 162. Specifically, the group generating unit 163 establishes a user as a reference user, and, if the difference of the map of a user and the map of the reference user satisfies a predetermined condition, the group generating unit 163 puts the user to the same group as the reference user. The group generating unit 163 then establishes reference users one after another, and repeats the determination as to whether the map of the reference user and that of a user satisfies the predetermined condition, until all of the users are put to any of the groups.

Figure 4:
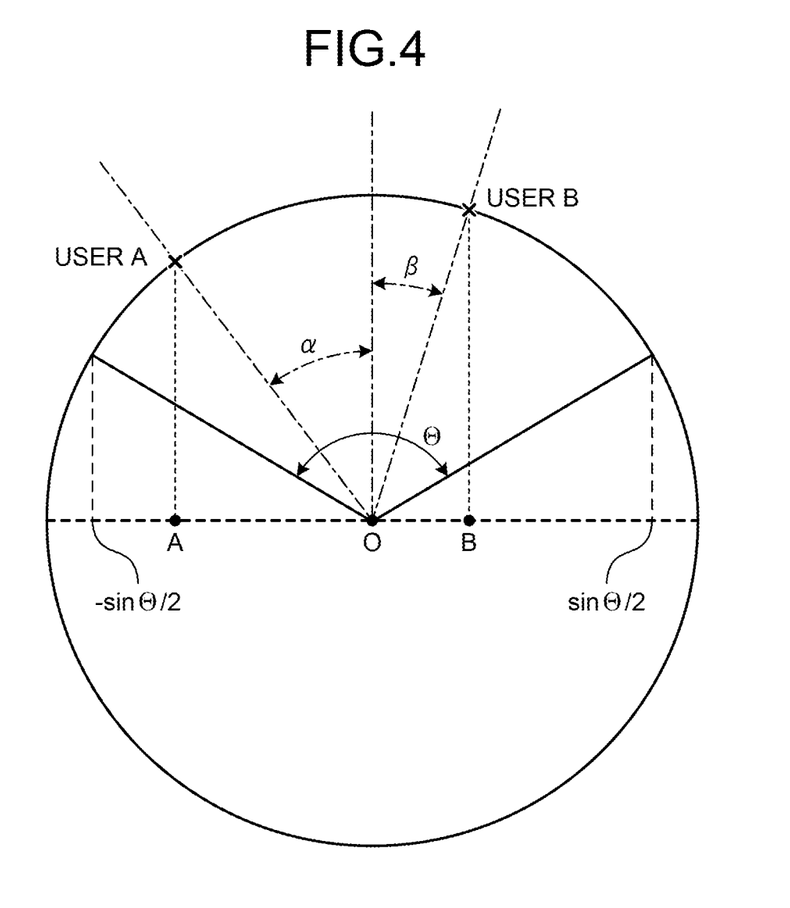
FIG. 4 is a schematic for explaining grouping according to the first embodiment.

The condition to be satisfied by the map of a user who is to be put to the same group as the reference user will now be explained with reference to FIG. 4. FIG. 4 is a schematic illustrating a point "O" that is the position of the radio communication apparatus 100, and the positions of the users A and B. In FIG. 4, it is assumed that the antenna elements 110-1 to 110-N in the radio communication apparatus 100, which is located at the point "O", are arranged one dimensionally in the horizontal direction. It is also assumed herein that the range across which the antenna elements 110-1 to 110-N can form a beam (hereinafter, referred to as a "beam-formable range") is an angle Θ illustrated in FIG. 4. A map that is sine of a direction of a beam formed within the range, therefore, falls within a range between −sin Θ/2 and sin Θ/2.

It is now assumed that the map calculating unit 162 has calculated an angle α as the angle representing the position of the user A, by estimating the direction of arrival of a reception signal. At this time, the map represented as sine related to the user A is sin α. In other words, the point A in FIG. 4 is separated from the point "O" by sin α. When this user A is established as a reference user, the map of the user B who belongs to the same group as the user A satisfies Equation (2) below.

$$\sin\beta = \sin\alpha + \frac{m}{M} \cdot 2\sin\frac{\Theta}{2} + \Delta x \quad (2)$$

In Equation (2), "β" denotes an angle representing the position of the user B, "Δx" denotes a permissible error, and "m" is an integer having an absolute value equal to or smaller than M. As it may be clear from Equation (2), the interval between sin α and sin β, which are the maps of the reference user A and the user B, respectively, is an integral multiple of one of the intervals resulting from equally dividing the map of the range across which the antenna elements 110-1 to 110-N can form a beam by M, plus the error Δx.

"M" denotes the number of the analog processing units 140-1 to 140-M and the number of the DA/AD converters 150-1 to 150-M included in the radio communication apparatus 100, and corresponds to the number of signals that can be transmitted or received simultaneously. Equation (2) mentioned above, therefore, represents that a user is put to the same group as the reference user if the user is separated from the reference user by a multiple of one of the intervals resulting from equally dividing the beam-formable range by the number of signals that can be transmitted or received simultaneously, in the sine map space.

Such grouping allows beams to be emitted at substantially the same power strength when the beams are steered simultaneously to the users belonging to the same group. The reason will now be explained.

When a beam is steered to the direction of the user A, the weight coefficient $w_{Aan}$ corresponding to the antenna element 110-$n$ in Equation (2) can be expressed as Equation (3) below, based on Equation (1) above.

$$W_{Aan} = e^{j2\pi(n-1)\frac{d}{\lambda}\sin\alpha} \quad (3)$$

When the beam is steered to the direction of the user B, who belongs to the same group as the user A, the weight coefficient $w_{Ban}$ corresponding to the antenna element 110-$n$ will be expressed as Equation (4) below.

$$W_{Ban} = e^{j2\pi(n-1)\frac{d}{\lambda}\sin\beta} \quad (4)$$

The pitch "d" between the antenna elements 110-1 to 110-N, the wavelength λ, and the beam-formable range Θ have a relation represented by Equation (5) below.

$$d = \frac{\lambda}{2\sin\frac{\Theta}{2}} \quad (5)$$

By substituting sin β and the pitch d in Equation (4) with those defined by Equation (2) and Equation (5), respectively, and simplifying the equation, Equation (6) is obtained.

$$W_{Ban} = W_{Aan} \cdot e^{\frac{j2\pi(n-1)m}{M}} \quad (6)$$

The error Δx in Equation (2) is, however, ignored in the process of obtaining Equation (6). By grouping the users in the manner described above, the weight coefficients corresponding to the respective antenna elements used to steer a beam to each of the users can be expressed using those used to steer a beam to the reference user.

Furthermore, focusing on the part of j2π(n−1)m/M related to the phase in Equation (6), this part related to the above-described phase will be different by a multiple of 2π between the weight coefficient $w_{Ban}$ corresponding to the antenna element 110-$n$ and the weight coefficient $w_{Ba(n+aM)}$ corresponding to the antenna element 110-($n$+aM) (where "a" is an integer equal to or greater than zero). In other words, the same phase will be shared among a set of M antenna elements, and the weight coefficients for the respective antenna elements 110-1 to 110-N that are connected to the same one of the analog processing units 140-1 to 140-M by the connection switch 130 shares the same phase.

By grouping the users in the manner described above, the signals processed by each of the analog processing units 140-1 to 140-M can all be weighted using a weight coefficient with the same phase.

Based on the above, the group generating unit 163 establishes a reference user, and the group generating unit 163 puts a user to the same group as the reference user if the user is separated from the reference user by a multiple of one of the intervals resulting from equally dividing the beam-formable range by M, in the sine map of the angles representing the positions of the respective users. At this time, the group generating unit 163 permits an error Δx in determining whether the user satisfies the condition, and putting the user to the same group as the reference user. The maximum permissible error $\Delta x_{max}$ is expressed as Equation (7) below, for example.

$$\Delta X_{max} = C \cdot \frac{1}{N} \cdot 2\sin\frac{\Theta}{2} \quad (7)$$

where C is a constant less than one, and is preferably a constant equal to or less than ½.

The analog weight coefficient calculating unit 164 calculates the weight coefficients $w_{a1}$ to $w_{aN}$ to be used by the phase shifter 120 for each of the groups of the users generated by the group generating unit 163. Specifically, the analog weight coefficient calculating unit 164 calculates the weight coefficients $w_{a1}$ to $w_{aN}$ for forming a beam steered to the direction of the reference user in each of the groups. In other words, the analog weight coefficient calculating unit 164 calculates the weight coefficient $w_{Aan}$ for the reference user A in Equation (6). The analog weight coefficient calculating unit 164 may take the error Δx used in grouping into consideration, and calculate the weight coefficients $w_{a1}$ to $w_{aN}$ for forming a beam steered to a direction shifted from the direction of the reference user by the average of the errors Δx corresponding to the respective users belonging to the group. The analog weight coefficient calculating unit 164 then notifies the phase shifter 120 and the direction-of-arrival estimating unit 161 of the calculated weight coefficients $w_{a1}$ to $w_{aN}$.

For each of the user groups generated by the group generating unit 163, the digital weight coefficient calculating unit 165 calculates weight coefficients for weighting a digital signal corresponding to each of the users. Specifically, the digital weight coefficient calculating unit 165 calculates weight coefficients corresponding to the difference in the direction of a user with respect to the direction of the reference user. In other words, the digital weight coefficient calculating unit 165 calculates a weight coefficient corresponding to a power of "e" in Equation (6) for each of the users.

Because the integer "m" in Equation (6) differs depending on the angle representing the position of a user, different weight coefficients are calculated for each user. Furthermore, while "n" in Equation (6) serves as an index of an antenna element, as mentioned earlier, the weight coefficient for the antenna element 110-$n$ and the weight coefficient for the antenna element 110-($n$+M) have the same phase. Therefore, the weight coefficients with the same phase can be assigned to every set of antenna elements that are arranged at intervals of M antenna elements and connected to the common analog processing unit 140-1 to 140-M, and therefore, M different weight coefficients are calculated for the N antenna elements 110-1 to 110-N.

The weighting processing unit 166 weights signals corresponding to each user in each of the groups, using the weight coefficients calculated by the digital weight coefficient calculating unit 165. In other words, the weighting processing unit 166 multiplies the calculated M different weight coefficients corresponding to each user to a signal input to the DA/AD converters 150-1 to 150-M, respectively, or to a signal output from the DA/AD converters 150-1 to 150-M, respectively.

The signal processing unit 167 generates a transmission signal by coding and modulating data addressed to a user, and demodulates and decodes a reception signal received from a user. At this time, the signal processing unit 167 may generate transmission signals addressed to the users belonging to the same group in a bulk, based on the grouping performed by the group generating unit 163, for example. The signal processing unit 167 may also establish a schedule for causing the users belonging to the same group to transmit signals simultaneously to the radio communication apparatus 100, and generate a controlling signal notifying the users of a result of scheduling, based on the grouping performed by the group generating unit 163, for example.

Figure 5:
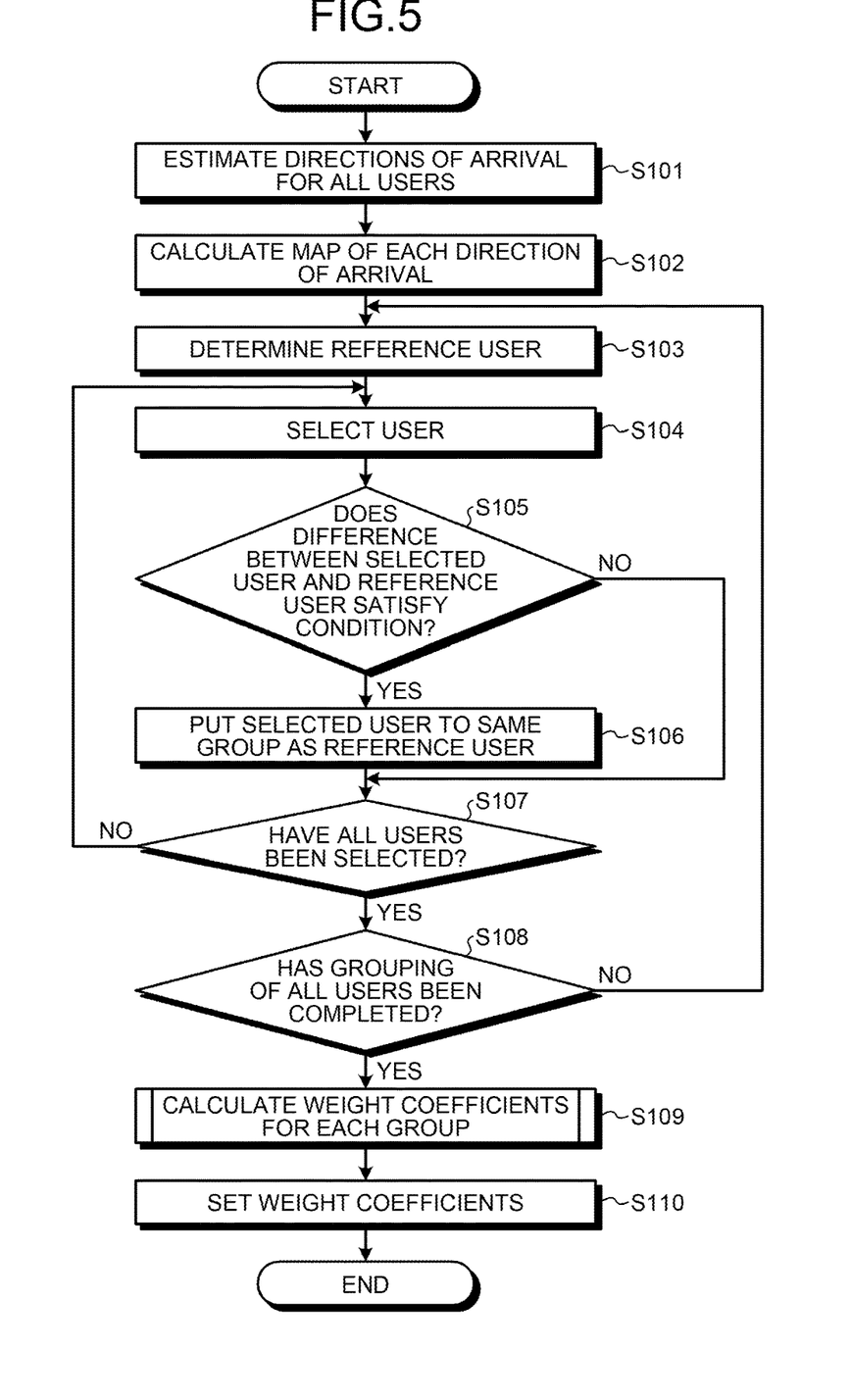
FIG. 5 is a flowchart illustrating a beam forming process according to the first embodiment.

A beam forming process performed by the radio communication apparatus 100 having such a configuration will now be explained with reference to the flowchart illustrated in FIG. 5.

When the radio communication apparatus 100 receives signals transmitted by a plurality of users who are to be communicating with the radio communication apparatus 100, the radio communication apparatus 100 estimates the direction of arrival of each of the reception signals received from the respective users (Step S101). Specifically, the analog processing units 140-1 to 140-M down-converts the reception signals received by the antenna elements 110-1 to 110-N, and the DA/AD converters 150-1 to 150-M AD-convert the resultant signals. The resultant digital reception signals are input to the direction-of-arrival estimating unit 161 in the processor 160, and the direction-of-arrival estimating unit 161 estimates the direction of arrival of each of the reception signals taking the weight coefficients $w_{a1}$ to $w_{aN}$ set to the phase shifter 120 into consideration. At this time, the direction-of-arrival estimating unit 161 estimates an angle with respect 0 degrees extending in the direction perpendicular to the arrangement direction of the antenna elements 110-1 to 110-N, as the direction of arrival. The estimated angle is the angle representing the position of the user.

The map calculating unit 162 then calculates a sine map of the angle representing the position of each of the users (Step S102). The map calculating unit 162 outputs the calculated map of all of the users to the group generating unit 163. The group generating unit 163 then groups the users. Through this process, the users to whom or from whom the signals are transmitted or received simultaneously are put to the same group.

Specifically, the group generating unit 163 establishes one of the users whose group has not been determined yet as the reference user (Step S103). The group generating unit 163 then selects one of the users whose group has not been determined yet (Step S104), and calculates the difference between the map of the selected user and the map of the reference user. Once the difference is calculated, the group generating unit 163 determines whether the difference satisfies the condition (Step S105). If the difference satisfies the condition (Yes at Step S105), the group generating unit 163 determines that the selected user is to be put to the same group as the reference user (Step S106).

The condition used in determining whether the selected user is to be put to the same group as the reference user is as follows. In other words, if the difference between the map of the reference user and that of the selected user is substantially equal to a multiple of one of the intervals resulting from equally dividing the map of the beam-formable range by M which is the number of the analog processing units 140-1 to 140-M in the sine map space, the group generating unit 163 puts the selected user to the same group as the reference user. In other words, denoting the map of the reference user by sin α and denoting the map of the selected user by sin β, if sin β satisfies Equation (2), the group generating unit 163 puts the selected user to the same group as the reference user.

After the group generating unit 163 determines whether the selected user is to be put to the same group as the reference user, the group generating unit 163 determines whether all of the undetermined users whose group has not been determined yet have been selected (Step S107). As a result of this determination, if there is any user who has not been selected yet (No at Step S107), the group generating unit 163 selects one of the users (Step S104), and determines whether the user is to be put to the same group as the reference user.

Once all of the users has been selected (Yes at Step S107), the group generating unit 163 then determines whether each of the users belongs to the same group as any one of the reference users, and whether all of the users have been put to the groups (Step S108). As a result of this determination, if there are any user who does not belong to any group (No at Step S108), the group generating unit 163 establishes one of such users as a reference user (Step S103), and determines whether each user is to be put to the same group as the reference user, in the same manner as described above.

Once the group generating unit 163 completes grouping described above, and all of the users have been grouped (Yes at Step S108), the analog weight coefficient calculating unit 164 and the digital weight coefficient calculating unit 165 calculate the weight coefficients for each of the groups (Step S109). The analog weight coefficient calculating unit 164 then outputs the weight coefficients $w_{a1}$ to $w_{aN}$ corresponding to each of the groups to the phase shifter 120, and the weight coefficients $w_{a1}$ to $w_{aN}$ are sets to the respective antenna elements 110-1 to 110-N. The digital weight coefficient calculating unit 165 outputs the calculated weight coefficients corresponding to each of the groups to the weighting processing unit 166, and the M weight coefficients are set to each of the users in the corresponding group (Step S110).

Signals are then transmitted and received in units of the group. Before transmitting or receiving the signals for a group, the weight coefficients corresponding to that group are set to the phase shifter 120 and the weighting processing unit 166. In this manner, this control allows the beams steered to the respective users to have substantially the same power strength, and beams at sufficient power strength can be steered to a plurality of respective users simultaneously.

Figure 6:
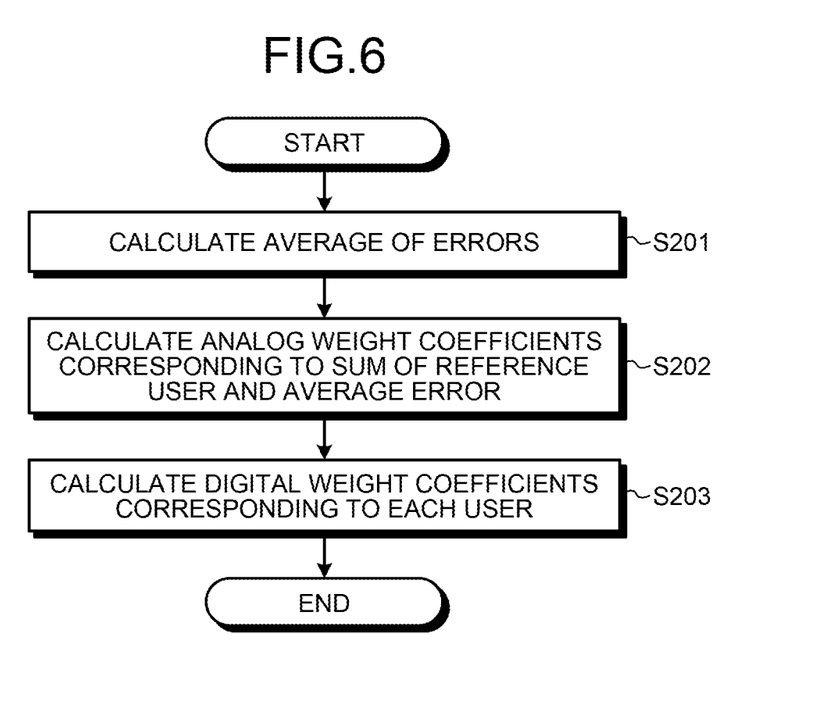
FIG. 6 is a flowchart illustrating a specific example of a weight coefficient calculating process.
Figure 7:
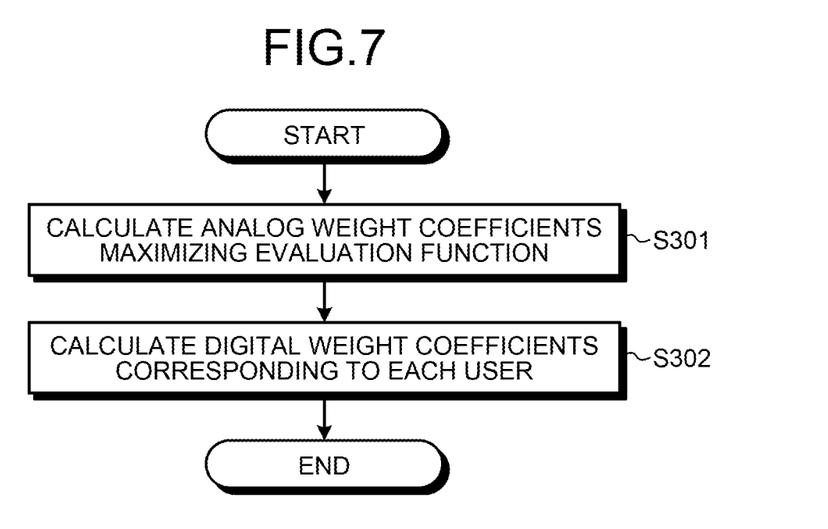
FIG. 7 is a flowchart illustrating another specific example of the weight coefficient calculating process.

Specific examples of the process of calculating the weight coefficients for each of the groups will now be explained with reference to FIGS. 6 and 7. FIGS. 6 and 7 are flowcharts illustrating different specific examples of the weight coefficient calculating process.

In the first specific example, the analog weight coefficient calculating unit 164 calculates an average of the errors corresponding to the maps of the respective users in the group, based on the map of the reference user, as illustrated in FIG. 6 (Step S201). In other words, the map of each user is separated from the map of the reference user by an interval corresponding to the result of adding the permissible error to one of the intervals resulting from equally dividing map of the range across which the antenna elements 110-1 to 110-N can form a beam by M. The analog weight coefficient calculating unit 164 therefore calculates an average of the errors, and calculates the weight coefficients $w_{a1}$ to $w_{aN}$ allowing a beam to be steered to a direction corresponding to the sum of the map of the reference user and the average error (Step S202). In other words, the analog weight coefficient calculating unit 164 calculates an average "y" of the errors $\Delta x$ in Equation (2) for each of the groups, using Equation (8) below.

$$y = \frac{1}{K}\sum_{k=1}^{K}\Delta x_k \qquad (8)$$

K in Equation (8) is the number of users in the group. The analog weight coefficient calculating unit 164 calculates the weight coefficients $w_{a1}$ to $w_{aN}$, for each of the groups, using Equation (9) below.

$$W_{an} = e^{j2\pi(n-1)\frac{d}{\lambda}(\sin\alpha+y)} \qquad (9)$$

In Equation (9), "e" denotes the base of natural logarithm, "j" denotes the imaginary unit, "d" denotes the pitch between the antenna elements, "$\lambda$" denotes the wavelength of the radio waves, and "$\sin\alpha$" denotes the map of the reference user. The weight coefficients $w_{a1}$ to $w_{aN}$ calculated by Equation (9) are weight coefficients for allowing a beam to be steered to a direction shifted from the direction of the reference user by the average of the errors.

Once the analog weight coefficients $w_{a1}$ to $w_{aN}$ are calculated, the digital weight coefficient calculating unit 165 calculates the weight coefficients corresponding to each of the users (Step S203). A digital weight coefficient corresponds to the difference between the map of the reference user and the map of the corresponding user, and M weight coefficients corresponding to the respective DA/AD converters 150-1 to 150-M are calculated for the one user. In other words, the weight coefficients $W_L$ corresponding to each of the users can be expressed as Equation (10) below.

$$w_L = e^{j2\pi(L-1)\frac{d}{\lambda}(\frac{m_k}{M}\cdot 2\sin\frac{\Theta}{2})} \qquad (10)$$

$w_L$ in Equation (10) denotes a weight coefficient corresponding to a DA/AD converter 150-L, and $m_k$ represents a value corresponding to the difference between the map of a user k and the map of the reference user. In other words, the map of the user k is separated from the map of the reference user by an $m_k$-multiple of one of the intervals resulting from equally dividing the beam-formable range by M in the sine map space.

In the manner described above, the weight coefficients for forming a beam shifted from the direction of the reference user by an average of the errors in the group can be calculated as analog weight coefficients, and the weight coefficients corresponding to the difference of each of the users with respect to the reference user can be calculated as digital weight coefficients.

By contrast, in the second specific example, as illustrated in FIG. 7, a predetermined evaluation function is established, and the analog weight coefficient calculating unit 164 calculates the weight coefficients $w_{a1}$ to $w_{aN}$ for steering a beam to the direction maximizing the evaluation function (Step S301). Specifically, the sum of reception qualities, such as signal-to-interference ratios (SIRs), at the respective users is established as the evaluation function, and the analog weight coefficient calculating unit 164 calculates the weight coefficients $w_{a1}$ to $w_{aN}$ for forming a beam in the direction maximizing the evaluation function. The SIR for a user can be calculated from information such as the path loss, and the frequency characteristics and the noise power of transmission signals and reception signals corresponding to the user. A channel capacity based on the SIR may also be used as the evaluation function.

Once the analog weight coefficients $w_{a1}$ to $w_{aN}$ are calculated, the digital weight coefficient calculating unit 165 calculates the weight coefficients corresponding to each of the users, in the same manner as in the first specific example (Step S302). The digital weight coefficients correspond to the difference between the map of the reference user and the map of each of the users, and M weight coefficients corresponding to the respective DA/AD converters 150-1 to 150-M are calculated for the corresponding user.

In the manner described above, the radio communication apparatus 100 according to the embodiment acquires an angle representing the position of each user by estimating the direction of arrival of the reception signal, and calculates a sine map of the angle. The radio communication apparatus 100 then puts users to the same group if the users are separated substantially by a multiple of one of the intervals resulting from equally dividing the map of the beam-formable range by the number of signals that can be transmitted or received simultaneously in the sine map space, and calculates, for each of the groups, the weight coefficients for forming a beam. Therefore, the weight coefficients for forming a beam steered to the direction of one of the users in the group can be used in forming the beams steered to the other users belonging to the same group, and the power strength of the beams for the respective users can be made substantially equal. As a result, beams at sufficient power strength can be steered to a plurality of respective users simultaneously.

[b] Second Embodiment

A second embodiment of the present invention is characterized in that users are put into the same group when the users are separated by an integral multiple of one of the intervals resulting from equally dividing the beam-formable range by the number of antenna elements in the sine map space.

The radio communication apparatus 100 according to the second embodiment has the same configuration as that according to the first embodiment, so the explanation thereof is omitted therein. The only difference is that, in the second embodiment, the connection switch 130 connects the antenna elements 110-1 to 110-N and the analog processing units 140-1 to 140-M in a configuration that is different from that according to the first embodiment.

Figure 8:
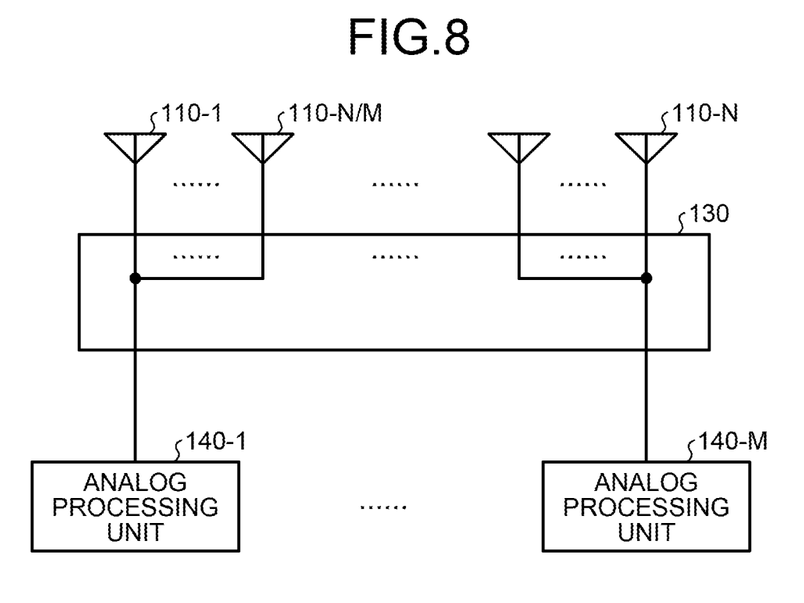
FIG. 8 is a schematic illustrating the connections established by a connection switch according to a second embodiment.

FIG. 8 is a schematic illustrating the connections established by the connection switch 130 according to the second embodiment. As illustrated in FIG. 8, for example, the connection switch 130 connects the analog processing unit 140-1 and a set of adjacently arranged (N/M) antenna elements counted from the antenna elements 110-1, and connects the analog processing unit 140-M to another set of adjacently arranged (N/M) antenna elements ending at the antenna elements N. In other words, the connection switch 130 connects each set of (N/M) adjacent antenna elements 110-1 to 110-N to the corresponding one of the analog processing units 140-1 to 140-M, unlike in the configuration according to the first embodiment.

In this embodiment, the group generating unit 163 in the processor 160 establishes one user as a reference user, and puts a user to the same group as the reference user if the difference between the map of the user and the map of the reference user satisfies a predetermined condition. The condition to be satisfied by the map of a user who is to be put to the same group as the reference user is for the map of the user to be separated from the map of the reference user by an integral multiple of one of the intervals resulting from equally dividing the map of the beam-formable range by the number of the antenna elements 110-1 to 110-N.

While the group generating unit 163 according to the first embodiment uses one of the intervals resulting from equally dividing the map of the beam-formable range by M, which is the number of signals that can be transmitted or received simultaneously, as a reference, the group generating unit 163 according to the second embodiment uses one of the intervals resulting from equally dividing the map of the beam-formable range by N which is the number of the antenna elements as the reference. When the users are grouped using this reference, the beams steered to the respective users have the power strengths illustrated in FIG. 9, for example.

Figure 9:
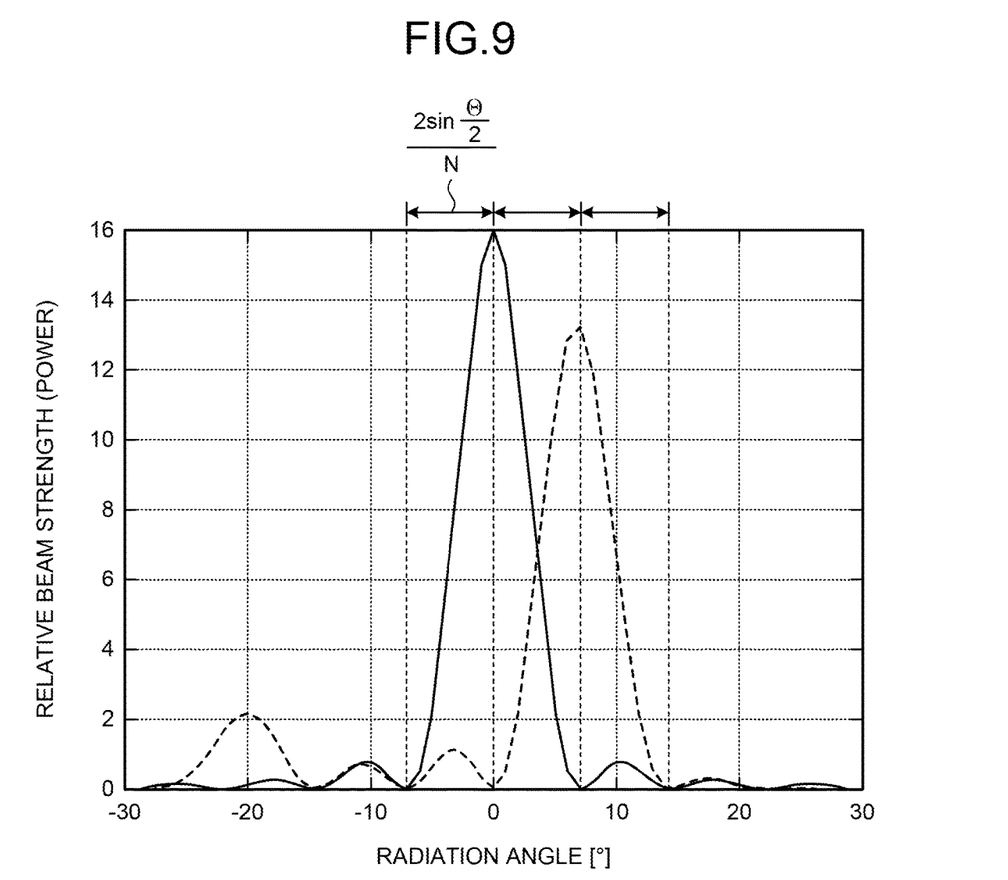
FIG. 9 is a schematic for explaining grouping according to the second embodiment.

As illustrated in FIG. 9, the two users represented by the solid line and the dotted line are separated from each other by one of the intervals resulting from equally dividing the beam-formable range 2 sin(Θ/2) by N which is the number of the antenna elements in the sine map space. As may be clear from FIG. 9, the power of the beam steered to one of the users is stronger, and that of the beam steered to the other user is weaker. In other words, each of the beams steered to the respective users do not cause the other to attenuate. Therefore, beams at sufficient power strength can be steered to both of the users illustrated in FIG. 9 simultaneously.

As described above, according to the embodiment, the radio communication apparatus according to the embodiment acquires an angle representing the position of each user by estimating the direction of arrival of the reception signal, and calculates a sine map of the angle. The radio communication apparatus then puts users into the same group when the users are separated substantially by a multiple of one of the intervals resulting from equally dividing the map of the beam-formable range by the number of antenna elements in the sine map space, and calculates, for each of the groups, the weight coefficients for forming a beam. Therefore, each of the beams steered to respective users in the same group does not cause the other to attenuate. As a result, beams at sufficient power strength can be steered to a plurality of respective users simultaneously.

[c] Third Embodiment

A third embodiment of the present invention is characterized in that the radio communication apparatus 100 switches the connections established by the connection switch and the modes for grouping the users, based on the distribution of the users.

The radio communication apparatus 100 according to the third embodiment has the same configuration as that according to the first embodiment, so the explanation thereof is omitted therein. In third embodiment, however, the processor 160 has a different function as that according to the first embodiment.

Figure 10:
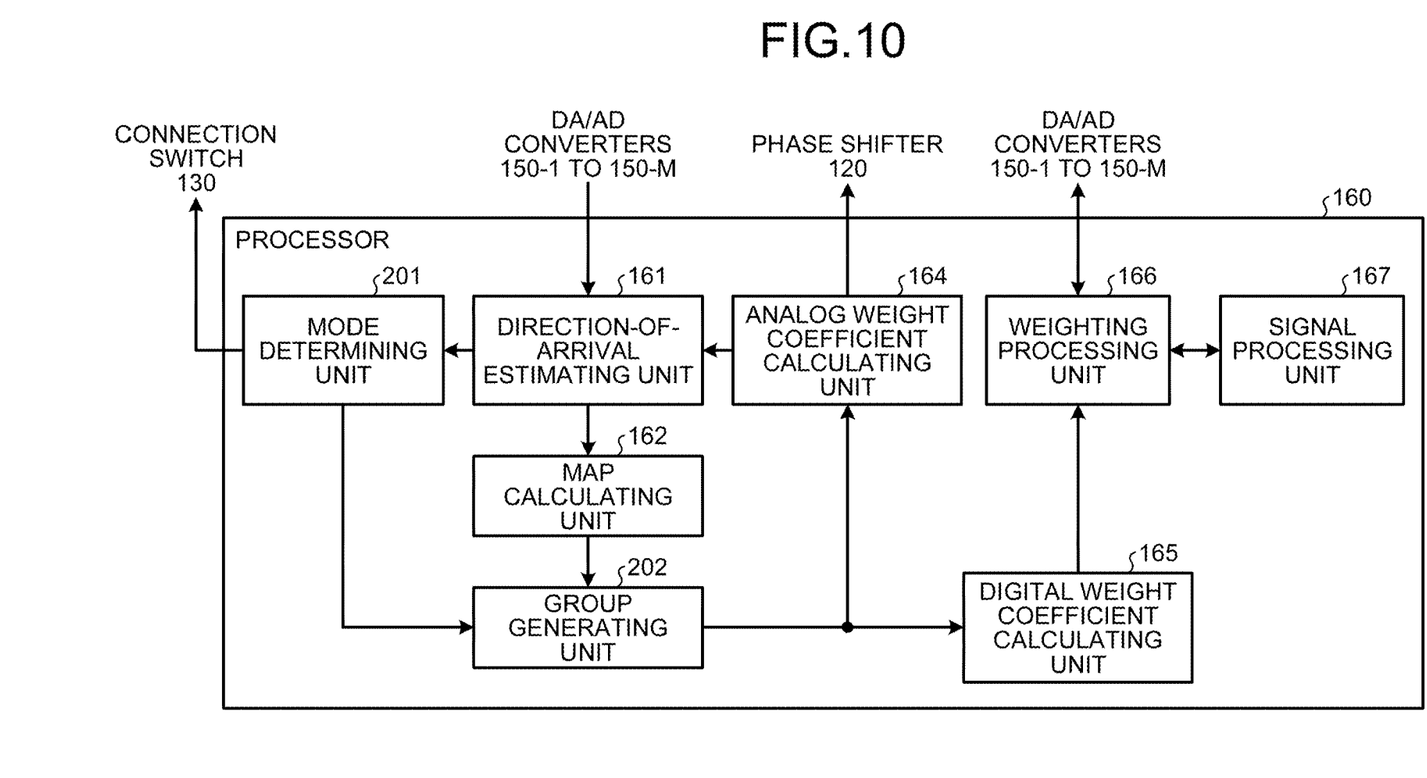
FIG. 10 is a block diagram illustrating functions of a processor according to a third embodiment of the present invention.

FIG. 10 is a block diagram illustrating functions of the processor 160 according to the third embodiment. In FIG. 10, the parts that are the same as those in FIG. 3 are assigned with the same reference numerals, and redundant explanations are omitted. The processor 160 illustrated in FIG. 10 has a mode determining unit 201 and a group generating unit 202, instead of the group generating unit 163 included in the processor 160 illustrated in FIG. 3.

The mode determining unit 201 determines which one of a first mode and a second mode is to be used in grouping users, based on the directions of arrival of the respective reception signals estimated by the direction-of-arrival estimating unit 161. Specifically, the mode determining unit 201 determines whether the positions of the users are scattered across a relatively wide area based on the directions of arrival of the respective reception signals. If the users are scattered, the mode determining unit 201 determines to group the users using the first mode. If the positions of the users are concentrated in a relatively smaller area, the mode determining unit 201 determines to group the users using the second mode. The mode determining unit 201, for example, calculates the dispersion of the directions of arrival of reception signals received from the respective users, and determines whether the positions of the users are scattered by determining whether the dispersion is equal to or greater than a predetermined threshold.

The first mode is a mode for grouping users by equally dividing the map of the beam-formable range by M which is the number of signals that can be transmitted or received simultaneously. The second mode is a mode for grouping users by equally dividing the map of the beam-formable range by N which is the number of the antenna elements. In other words, the first mode is the mode for grouping users in the manner described in the first embodiment, and the second mode is the mode for grouping users in the manner described in the second embodiment.

The mode determining unit 201 notifies the connection switch 130 of which one of the first mode and the second mode is to be used in grouping the users. With this notification, the mode determining unit 201 can cause the connection switch 130 to connect each set of M antenna elements 110-1 to 110-N to the corresponding one of the analog processing units 140-1 to 140-M when the users are grouped using the first mode. By contrast, the mode determining unit 201 causes the connection switch 130 to connect each set of (N/M) adjacent antenna elements 110-1 to 110-N to the corresponding one of the analog processing units 140-1 to 140-M when the users are to be grouped using the second mode.

When the mode determining unit 201 determines to group users using the first mode, the group generating unit 202 puts the users to the same group if the users are separated by a multiple of one of the intervals resulting from equally dividing the beam-formable range by the number of signals that can be transmitted or received simultaneously in the sine map space. In other words, when the mode determining unit 201 determines to group users using the first mode, the group generating unit 202 performs the grouping as described in the first embodiment.

When the mode determining unit 201 determines to group users using the second mode, the group generating unit 202 puts users to the same group if the users are separated by a multiple of one of the intervals resulting from equally dividing the beam-formable range by the number of the antenna elements in the sine map space. In other words, when the mode determining unit 201 determines to group users using the second mode, the group generating unit 202 performs the grouping as described in the second embodiment.

In this embodiment, when user are scattered across a relatively wide area, the users are grouped in the manner described in the first embodiment, and when user are concentrated to a relatively small area, the users are grouped in the manner described in the second embodiment. Therefore, in the first mode that is selected when the user are scattered across a relatively wide area, the connection switch 130 connects each set of M antenna elements 110-1 to 110-N to the same corresponding one of the analog processing units 140-1 to 140-M, and the group generating unit 202 groups the users with reference to one of the intervals resulting from equally dividing the beam-formable range by M which is the number of signals that can be transmitted or received simultaneously in the sine map space.

By contrast, in the second mode that is used when the users are concentrated to a relatively small area, the connection switch 130 connects each set of (N/M) adjacent antenna elements 110-1 to 110-N to the same corresponding one of the analog processing units 140-1 to 140-M, and the group generating unit 202 groups the users with reference to one of the intervals resulting from equally dividing the beam-formable range by N which is the number of the antenna elements in the sine map space.

In this manner, because users are grouped using a mode that is switched based on the distribution of users, beams can be formed for each of the groups in a manner suitable for the user distribution.

As described above, the radio communication apparatus according to the embodiment acquires an angle representing the position of each user by estimating the direction of arrival of the reception signal, and switches the mode for group generation based on the result of determining whether the users are scattered across a relatively wide area. Therefore, beams can be formed for each of the groups in a manner suitable for the user distribution, and beams at sufficient power strength can be steered to a plurality of respective users simultaneously.

According to one aspect of the radio communication apparatus and the beam controlling method according to the embodiment, beams having sufficient power strength can be steered to a plurality of users simultaneously.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication apparatus comprising:
   an estimating unit that estimates directions of arrival of signals transmitted by a plurality of respective user terminals;
   a calculating unit that calculates a map as a trigonometric function of an angle representing each of the directions of arrival estimated by the estimating unit;
   a grouping unit that groups the user terminals based on the maps calculated by the calculating unit;
   a determining unit that determines a weight coefficient for forming a directional beam steered to a user terminal belonging to a group, for each group resultant of grouping performed by the grouping unit;
   a plurality of analog processing units each of which performs predetermined analog processing on a transmission signal or a reception signal; and
   a plurality of antenna elements that are connected to the analog processing units, wherein
   the determining unit comprises:
      a first weight coefficient calculating unit that calculates a plurality of first weight coefficients for weighting the respective antenna elements; and
      a second weight coefficient calculating unit that calculates a plurality of second weight coefficients for weighting a transmission signal transmitted to or a signal received from each user terminal which belongs to each of the groups.

2. The radio communication apparatus according to claim 1, wherein the grouping unit puts user terminals to a same group when the user terminals are separated by an integral multiple of one of intervals resulting from equally dividing a range across which the antenna elements are capable of forming a directional beam by number of the analog processing units, in a map space of the trigonometric function used by the calculating unit.

3. The radio communication apparatus according to claim 2, wherein the antenna elements are arranged one dimensionally in a line, and a set of the antenna elements arranged at intervals of antenna elements in number equal to the number of the analog processing units is connected to same one of the analog processing units.

4. The radio communication apparatus according to claim 1, wherein the grouping unit puts user terminals to the same group when the user terminals are separated by an integral multiple of one of intervals resulting from equally dividing a range across which the antenna elements are capable of forming a directional beam by number of the antenna elements in a map space of the trigonometric function used by the calculating unit.

5. The radio communication apparatus according to claim 4, wherein the antenna elements are arranged one dimensionally in a line, and a set of adjacent antenna elements in number equal to a quotient of dividing the number of the antenna elements by the number of the analog processing units are connected to same one of the analog processing units.

6. The radio communication apparatus according to claim 1, wherein
the grouping unit determines a distribution of user terminals based on the directions of arrival estimated by the estimating unit, and performs one of first grouping and second grouping depending on a result of the determination, the first grouping putting user terminals to a same group when the user terminals are separated by an integral multiple of one of intervals resulting from equally dividing a range across which the antenna elements are capable of forming a directional beam by the number of the analog processing units, and the second grouping putting user terminals to the same group when the user terminals are separated by an integral multiple of one of the intervals resulting from equally dividing the range across which the antenna elements are capable of forming a directional beam by number of the antenna elements, in a map space of the trigonometric function used by the calculating unit.

7. The radio communication apparatus according to claim 1, wherein
the first weight coefficient calculating unit calculates the first weight coefficients for forming a directional beam steered to a reference user terminal which serves as a reference in a group, and
the second weight coefficient calculating unit calculates the second weight coefficients, for each of the user terminals, based on a difference between a map of the reference user terminal and the corresponding user terminal.

8. A beam controlling method implemented by a radio communication apparatus that includes a plurality of analog processing units each of which performs predetermined analog processing on a transmission signal or a reception signal and a plurality of antenna elements that are connected to the analog processing units, the beam controlling method comprising:
estimating directions of arrival of signals transmitted by a plurality of respective user terminals;
calculating a map as a trigonometric function of an angle representing each of the estimated directions of arrival;
grouping the user terminals based on the calculated maps; and
determining a weight coefficient for forming a directional beam steered to a user terminal belonging to a group, for each group resultant of the grouping, wherein
the determining comprises:
calculating a plurality of first weight coefficients for weighting the respective antenna elements; and
calculating a plurality of second weight coefficients for weighting a transmission signal transmitted to or a signal received from each user terminal which belongs to each of the groups.

* * * * *